(12) United States Patent
Hövelhaus et al.

(10) Patent No.: US 11,811,229 B2
(45) Date of Patent: Nov. 7, 2023

(54) METHOD AND SYSTEM FOR CONTROLLING AN ELECTRICAL INSTALLATION

(71) Applicant: ES • FOR • IN SE, Essen (DE)

(72) Inventors: Christian Hövelhaus, Essen (DE); Philipp Thielke, Essen (DE)

(73) Assignee: ES • FOR • IN SE, Essen (DE)

( * ) Notice: Subject to any disclaimer, the term of this patent is extended or adjusted under 35 U.S.C. 154(b) by 0 days.

(21) Appl. No.: 17/950,711

(22) Filed: Sep. 22, 2022

(65) Prior Publication Data

US 2023/0013847 A1    Jan. 19, 2023

Related U.S. Application Data

(63) Continuation of application No. PCT/EP2021/050212, filed on Jan. 8, 2021.

(30) Foreign Application Priority Data

Jan. 10, 2020    (DE) ......................... 102020100467.2

(51) Int. Cl.
   *G06Q 40/04*    (2012.01)
   *H02J 3/00*    (2006.01)
   *G06Q 50/06*    (2012.01)

(52) U.S. Cl.
   CPC .............. *H02J 3/008* (2013.01); *G06Q 40/04* (2013.01); *G06Q 50/06* (2013.01); *H02J 3/003* (2020.01); *H02J 3/004* (2020.01)

(58) Field of Classification Search
   CPC .............................. G06Q 40/04; G06Q 50/06
   See application file for complete search history.

(56) References Cited

U.S. PATENT DOCUMENTS

| 2005/0039787 A1* | 2/2005 | Bing ...................... G06Q 40/04 |
| | | 136/243 |
| 2015/0001944 A1 | 1/2015 | Markowz et al. |

(Continued)

FOREIGN PATENT DOCUMENTS

| DE | 102016118115 | | 3/2018 | |
| DE | 102017106465 A1 * | | 9/2018 | ............... H02J 3/14 |
| GB | 2514121 A * | | 11/2014 | ........... G05B 13/026 |

OTHER PUBLICATIONS

Nexight Group: Electrical Power Industry Needs for Grid-Scale Storage Applications, Dec. 2010, U.S. Department Energy, pp. 1-40 (Year: 2010).*

(Continued)

*Primary Examiner* — Bijendra K Shrestha
(74) *Attorney, Agent, or Firm* — Burris Law, PLLC

(57) ABSTRACT

A method for controlling an electrical installation at least one of an electrical energy source or an energy sink. The electrical installation is coupled to a power grid. The method includes a period of time having a start time and a duration being specified, an upward flexibility Fo, which includes a forecast maximum feed-in power increase or feed-out power decrease, and a downward flexibility Fu, which includes a forecast maximum feed-out power increase or feed-in power decrease, being set for the period of time, a selling threshold price Pv and a purchasing threshold price Pe being set for the period of time, and an electricity trading transaction being concluded for the period of time. The electricity trading transaction includes a base value, a base quantity, a base price, a date on which the electricity trading transaction is to be carried out.

19 Claims, 2 Drawing Sheets

(56) References Cited

U.S. PATENT DOCUMENTS

2019/0252880 A1 8/2019 Watanabe et al.
2019/0369572 A1 12/2019 Watanabe et al.

OTHER PUBLICATIONS

Department of Energy (www.energy.gov): The Smart Grid: An Introduction, Feb. 6, 2008, pp. 1-49 (Year: 2008).*
drax.com: The great balancing act: what it takes to keep the power grid stable, Jun. 8, 2018, pp. 1-12 (Year: 2018).*
International Search Report issued in corresponding International Application PCT/EP2021/050212, dated Apr. 8, 2021.

* cited by examiner

METHOD AND SYSTEM FOR CONTROLLING AN ELECTRICAL INSTALLATION

CROSS-REFERENCE TO RELATED APPLICATIONS

This application is a continuation of International Application No. PCT/EP2021/050212, filed on Jan. 8, 2021, which claims priority to and the benefit of DE 102020100467.2, filed on Jan. 10, 2020. The disclosures of the above applications are incorporated herein by reference.

FIELD

The present disclosure relates to a method and a system for controlling an electrical installation comprising an electrical energy source and/or an electrical energy sink and being coupled to a power grid.

BACKGROUND

The statements in this section merely provide background information related to the present disclosure and may not constitute prior art.

Known is the so-called load control, which describes the control of the demand for network-connected services from customers in industry, commerce and private households. Such services relate, for example, to the consumption of electricity or electrical energy that is supplied to an electrical installation via a power grid. Load control typically reduces demand without having to increase power generation. If there are bottlenecks in power generation, for example, if a large power plant fails, or if there is a great need for electrical energy or if grid operation is disrupted, an underfrequency and/or undervoltage can occur in the power grid. Electrical energy sinks connected to the power grid, such as power-consuming devices, can then be switched off and switched on again by remote control in order to stabilize the grid frequency and/or the grid voltage. Such a switching off is also referred to as load shedding. Industrial consumers, such as aluminum smelters, or heat pump heating systems in private households can be switched off for a certain period of time without affecting the work process. In such cases, a contract regulates how long and which devices may be switched off.

The procurement of electricity on a day-ahead market is also known. This means that an electricity customer, such as a large industrial consumer, creates daily forecasts of his/her electricity requirements for the following day in a predetermined time frame and concludes corresponding electricity trading transactions on an electricity exchange, such as the computer exchange EPEX SPOT or EEX. The time grid usually consists of consecutive periods of 15 minutes each, and the electricity trading transactions are then so-called 15-minute contracts. If, on the following day, the actual power consumption in a certain period of time exceeds the power demand forecast on the previous day, this deviation is compensated for in the short term by the so-called control energy. Said control energy is physically provided by the transmission system operator of the respective power grid and then billed to the electricity customer with the aid of a balancing instrument known as balance energy. The price of said balance energy is only set retrospectively and is associated with high risks.

The procurement of electricity on an intraday market is also known. This means that the electricity customer continuously concludes corresponding electricity trading transactions on an electricity exchange such as EPEX SPOT. This means that trading participants' bids are continuously entered into an order book and two bids are executed as soon as they are compatible. Said electricity trading transactions can be concluded at very short notice, for example, trading on EPEX SPOT within the German control areas can take place up to 5 minutes before physical delivery.

SUMMARY

This section provides a general summary of the disclosure and is not a comprehensive disclosure of its full scope or all of its features.

In one form, the present disclosure provides improving the operation of an electrical installation comprising an electrical energy source and/or an electrical energy sink and being coupled to a power grid.

According to a first aspect, the present disclosure proposes a method for controlling an electrical installation, wherein the installation comprises an electrical energy source and/or an electrical energy sink and is coupled to a power grid, wherein a future period of time having a start time and a duration is specified; an upward flexibility is set for the period of time, wherein the upward flexibility comprises a forecast maximum feed-in power increase and/or a forecast maximum feed-out power decrease; a downward flexibility is set for the period of time, wherein the downward flexibility comprises a forecast maximum feed-out power increase and/or a forecast maximum feed-in power decrease; a selling threshold price is set for the period of time; a purchasing threshold price is set for the period of time; an electricity trading transaction is concluded for the period of time, wherein the electricity trading transaction comprises a base value, a base amount, a base price, a date on or by which the electricity trading transaction must be carried out, and the obligation for physical fulfillment during this period of time; the base value comprises a positive or negative on-demand power; the date is the start time; the physical fulfillment comprises the delivery of the base value in the amount of the base amount; in the case of positive on-demand power, $ALp \leq Fo$ and $BPp \geq Pv$ applies, wherein ALp is the base amount of positive on-demand power, Fo is the upward flexibility, BPp is the base price of the positive on-demand power, and Pv is the selling threshold price; in the case of negative on-demand power, $ALn \leq Fu$ and $BPn \leq Pe$, applies, wherein ALn is the base amount of negative on-demand power, Fu is the downward flexibility, BPn is the base price of the negative on-demand power, and Pe is the purchasing threshold price; on or by the date the installation is controlled such that the installation delivers the base value in the amount of the base amount during the period of time.

According to a second aspect, the present disclosure proposes a system for controlling an electrical installation, wherein the installation comprises an electrical energy source and/or an electrical energy sink and is coupled to a power grid, wherein the system can be coupled or is coupled to the installation and/or is or can be operatively connected to the installation and is designed such that the system can execute or executes one of the proposed methods.

The present disclosure may improve economical operation of the installation, improve efficiency of the installation, and/or reduce risks associated with procuring the electricity desired for the operation of the installation.

The power grid is, in one form, a public power grid.

The duration of the future period of time can be chosen as desired and is, in one form, 5 minutes or 6 minutes or 10 minutes or 15 minutes or 20 minutes or 30 minutes or 60 minutes. The starting time of the future period can be chosen as desired and is, in one form, 5 minutes from now or 15 minutes from now or 30 minutes from now or 60 minutes from now or 24 hours from now.

The setting of an upward flexibility, the setting of a downward flexibility, the setting of a selling threshold price, the setting of a purchasing threshold price, and the conclusion of an electricity trading transaction take place before the start time.

With regard to electricity trading, upward flexibility relates to the "sell" direction from the installation's point of view, since upward flexibility describes the possibility that the installation can feed in more power into the power grid than originally planned and/or that the installation can feed out less power than originally planned from the power grid—or in other words: the power grid feeds in less power into the installation than originally planned. With regard to electricity trading, downward flexibility relates to the "purchase" direction from the installation's point of view, since downward flexibility describes the possibility that the installation can feed in less power into the power grid than originally planned and/or that the installation can feed out more power than originally planned from the power grid—or in other words: the power grid feeds in more power into the installation than originally planned. Said flexibilities are powers and have the unit MW, in one form. The power fed into the power grid by the installation is also referred to as "feed-in power", and the power fed out of the power grid by the installation—and thus fed into the installation through the power grid—is also referred to as "feed-out power".

The following examples, in which the duration is 15 minutes, that is, 0.25 h and the start time is 24 hours from now, serve for a better understanding:

Example 1: The installation comprises a fuel cell that can only deliver feed-in power. For the period of time, the forecast provides that the fuel cell, during the duration, should deliver a planned feed-in power E0 in the amount of 0.8 kW, corresponding to electrical energy in the amount of 0.2 kWh=0.8 kW×0.25 h, but can increase its feed-in power up to a maximum value E2 of 2 kW, corresponding to electrical energy in the amount of 0.5 kWh=2 kW×0.25 h, and can decrease it up to a minimum value E1 of 0.2 kW, corresponding to electrical energy in the amount of 0.05 kWh=0.2 kW×0.25 h. From this data is forecast a maximum feed-in power increase according to Eo=E2−E0 in the amount of 1.2 kW=2 kW−0.8 kW, corresponding to electrical energy in the amount of 0.3 kWh=1.2 kW×0.25 h, and a maximum feed-in power decrease according to Eu=E0−E1 in the amount of 0.6 kW=0.8 kW−0.2 kW, corresponding to electrical energy in the amount of 0.15 kWh=0.6 kW×0.25 h. Then the upward flexibility according to Fo=Eo is set to a value of 1.2 kW and the downward flexibility according to Fu=Eu to a value of 0.6 kW. In one form, said flexibility values are multiplied by a safety factor that is less than 100% and is, in one form, 99% or 98% or 95% or 90%.

Example 2: The installation comprises an electrolytic cell that can only absorb feed-out power. For the period of time, the forecast provides that the electrolytic cell, during the duration, should absorb a planned feed-power power A0 in the amount of 1 kW, corresponding to electrical energy in the amount of 0.25 kWh=1 kW×0.25 h, but can increase its feed-out power up to a maximum value A2 of 4 kW, corresponding to electrical energy in the amount of 1 kWh=4 kW×0.25 h, and can decrease it down to a minimum value A1 of 0 kW, corresponding to electrical energy in the amount of 0 kWh=0 kW×0.25 h. From this data is forecast a maximum feed-out power increase according to Ao=A2−A0 in the amount of 3 kW=4 kW−1 kW, corresponding to electrical energy in the amount of 0.74 kWh=3 kW×0.25 h, and a maximum feed-out power decrease according to Au=A0−A1 in the amount of 1 kW=1 kW−0 kW, corresponding to electrical energy in the amount of 0.25 kWh=0.6 kW×0.25 h. Then the upward flexibility according to Fo=Au is set to a value of 1 kW and the downward flexibility according to Fu=Ao to a value of 3 kW. In one form, said flexibility values are multiplied by a safety factor that is less than 100% and is, in one form, 99% or 98% or 95% or 90%.

Example 3: The installation is a steel mill and comprises a gas power plant that can only deliver feed-in power and an electric arc furnace that can only absorb feed-out power. On the one hand, the forecast provides for the period of time that the gas power plant, for the duration, should deliver a planned feed-in power E0 in the amount of 20 MW, but can increase its feed-in power to a maximum value E2 of 50 MW and can reduce it to a minimum value E1 of 4 MW. On the other one hand, the forecast provides for the period of time that the electric arc furnace, for the period, should absorb a planned feed-out power A0 in the amount of 5 MW, but can increase its feed-out power to a maximum value A2 of 11 MW and can reduce it to a minimum value A1 of 3 MW. From this data is forecast a maximum feed-in power increase according to Eo=E2−E0 in the amount of 30 MW=50 MW-20 MW and a maximum feed-in power decrease according to Eu=E0−E1 in the amount of 16 MW=20 MW-4 MW and a maximum feed-out power increase according to Ao=A2−A0 in the amount of 6 MW=11 MW−5 MW and a maximum feed-out power decrease according to Au=A0−A1 in the amount of 2 MW=5 MW-3 MW. The upward flexibility according to Fo=Eo+Au is then set to a value of 32 MW=30 MW+2 MW and the downward flexibility according to Fu=Ao+Eu to a value of 22 MW=6 MW+16 MW. In one form, said flexibility values are multiplied by a safety factor that is less than 100% and is, in one form, 99% or 98% or 95% or 90%.

Example 4: The installation comprises a battery storage power plant that can both deliver feed-in power and absorb feed-off power. For the period of time, the prognosis provides that the battery storage power plant, during the duration, should deliver a planned feed-in power E0 in the amount of 0 kW and absorb a planned feed-out power A0 in the amount of 5 kW, but can increase its feed-in power to a maximum value E2 of 6 kW and not reduce it below the value E1 of 0 kW and can increase its feed-out power to a maximum value A2 of 9 kW and can reduce it to a minimum value A1 of 0 kW. From this data is forecast a maximum feed-in power increase according to Eo=E2−E0 in the amount of 6 kW=6 kW−0 kW and a maximum feed-in power decrease according to Eu=E0−E1 in the amount of 0 kW=0 kW−0 kW and a maximum feed-out power increase according to Ao=A2−A0 in the amount of 4 kW=9 kW−5 kW and a maximum feed-out power decrease according to Au=A0−A1 in the amount of 5 kW=5 kW−0 kW. The upward flexibility according to Fo=Eo+Au is then set to a value of 11 kW=6 kW+5 kW and the downward flexibility according to Fu=Ao+Eu to a value of 4 kW=4 kW+0 kW. In one form, said flexibility values are multiplied by a safety factor that is less than 100% and is, in one form, 99% or 98% or 95% or 90%.

With regard to electricity trading, the selling threshold price represents a minimum price demanded by the installation, at which the installation undertakes to feed in more power into the power grid, that is, to deliver more feed-in power, and/or to feed out less power out of the power grid, that is, absorb less feed-out power. With regard to electricity trading, the purchasing threshold price represents a maximum price offered by the installation at which the installation undertakes to feed in less power into the power grid during the period of time, that is, to deliver less feed-in power, and/or to feed out more power from the power grid, that is, absorb more feed-out power. Said threshold prices are relative prices related to the amount of energy and have the unit €/MWh, in one form.

The base amount is the quantity of the base value, that is, the quantity of positive or negative on-demand power, and has the unit MW, in one form, and the base price is the price of the base value. The base price is a relative price related to the amount of energy and has the unit €/MWh, in one form. With regard to the electricity trading transaction, the positive on-demand power means that the power grid has more power available and/or that more power than planned is fed into the power grid and/or that less power than planned is fed out of the power grid. Thus, the selling threshold price is that price at which or from which the installation is prepared to deliver positive on-demand power and, so to speak, load its upward flexibility. With regard to the electricity trading transaction, the negative on-demand power means that the power grid has less power available and/or that less power than planned is fed into the power grid and/or that more power than planned is fed out of the power grid. Thus, the purchasing threshold price is that price at which or up to which the installation is prepared to deliver negative on-demand power and, so to speak, load the downward flexibility.

The proposed method and the proposed system can each be designed in any way as desired, in one form, for controlling no additional or at least one additional electrical installation. Additionally, it should be understood that the example systems are merely exemplary and should not be constructed as limiting the scope of the present disclosure.

Each of the installations can be designed in any way as desired, in one form, as a power plant or factory and/or such that said installation comprises no additional or at least one additional electrical energy source and/or no additional or at least one additional electrical energy sink.

Each of the energy sources can be designed in any way as desired, such as a battery storage power plant, pumped storage power plant, compressed air storage power plant, flywheel storage power plant, battery, capacitor, electric car, plug-in hybrid electric vehicle, traction battery, electric generator, fuel cell, hydroelectric power plant, steam turbine, gas turbine, solar thermal power plant, geothermal power plant, coal power plant, oil power plant, gas power plant, biomass power plant, waste incineration plant, nuclear power plant, tidal power plant, combined heat and power plant, industrial power plant, wind power system or photovoltaic system.

Each of the energy sinks can be designed in any way as desired, in one form, as a battery storage power plant, pumped storage power plant, compressed air storage power plant, flywheel storage power plant, battery, capacitor, electric car, plug-in hybrid electric vehicle, traction battery, electric motor, assembly line, bottling plant, rolling mill, cold room, packaging machine, printing machine, machine tool, melting furnace, arc furnace, induction furnace, rotary kiln, heat pump, conveyor belt, sewage treatment plant, treatment plant, refinery, electrolytic cell, charging station, air conditioning, fan heater, washing machine, tumble dryer, dishwasher, television set, electric oven, electric stove, microwave oven, coffee maker, refrigerator or freezer.

In one form, at least one of the energy sinks is coupled to at least one of the energy sources via at least one installation-internal power grid, which is also referred to below as the plant network.

Controlling the installation comprises, in one form, changing the power output of at least one of the energy sources in at least one of the plant networks and/or disconnecting at least one of the energy sources from at least one of the plant networks and/or connecting at least one of the energy sources to at least one of the plant networks and/or changing the power output of at least one of the energy sources in at least one of the plant networks and/or disconnecting at least one of the energy sources from the power grid and/or connecting at least one of the energy sources to the power grid and/or changing the power consumption of at least one of the energy sinks from at least one of the plant networks and/or disconnecting at least one of the energy sinks from at least one of the plant networks and/or connecting at least one of the energy sinks to at least one of the plant networks and/or changing the power consumption of at least one of the energy sinks from the power grid and/or disconnecting at least one of the energy sinks from the power grid and/or connecting at least one of the energy sinks to the power grid.

The proposed method can be designed in any way as desired, in one form, such that no additional or at least one additional electricity trading transaction is concluded for the period of time. However, the on-demand powers of the electricity trading transactions concluded for the period of time in one form do not exceed the corresponding flexibility overall.

In one variation of the proposed method, it is specified that the setting of an upward flexibility and/or the setting of a downward flexibility and/or the setting of a selling threshold price and/or the setting of a purchasing threshold price comprises historical data and/or plan data and/or real-time data being evaluated. The historical data, the plan data and/or the real-time data each comprise, in one form, data that relate at least in part to the operation of at least one of the installations and/or at least one of the energy sources and/or at least one of the energy sinks and, in one form, comprise the time profile utilization of at least one of the installations and/or at least one of the energy sources and/or at least one of the energy sinks and/or the time profile of the power consumption of at least one of the installations and/or at least one of the energy sinks and/or the time profile of the power output of at least one of the installations and/or at least one of energy sources. The historical data relate, in one form, to the past operation of at least one of the installations and/or at least one of the energy sources and/or at least one of the energy sinks. The plan data relate, in one form, to the planned, future operation of at least one of the installations and/or at least one of the energy sources and/or at least one of the energy sinks. The real-time data relate, in one form, to the current operation of at least one of the installations and/or at least one of the energy sources and/or at least one of the energy sinks. As an alternative or in addition to said evaluation, other data can also be evaluated as desired.

In one variation of the proposed method, it is specified that the real-time data are determined at least partially with the aid of at least one sensor.

In one variation of the proposed system, it is specified that the system comprises a sensor which can be coupled or is coupled to the installation and/or can be or is operatively connected to the installation and is designed such that at least part of the real-time data can be or is determined with the aid of the sensor. The system can be designed in any way as desired, in one form, such that said system comprises no additional sensor or at least one additional sensor.

In one variation of the proposed method, it is specified that an availability of the installation is determined; if the determined availability does not have the value "available", or if the determined availability has the value "not available", the concluded electricity trading transaction is terminated or canceled or settled.

This determination can be done in any way as desired, in one form, with the aid of at least one of the sensors and/or with the aid of at least one availability switch that an operator of the installation can actuate, whereby the availability is set to the value "not available."

Each of the availability switches can be designed in any way as desired, such as an emergency off switch or as an emergency stop switch and/or such that said availability switch is associated with at least one of the energy sources and/or at least one of the energy sinks.

In one form, the concluded electricity trading transaction is canceled or settled with the aid of a counter electricity trading transaction. The cancellation or settlement can be done in any way as desired, for example, with the aid of no additional or at least one additional counter electricity trading transaction.

In one form, at least one of the counter electricity trading transactions is concluded analogously to the conclusion of the completed electricity trading transaction.

In one variation of the proposed method, it is specified that the controlling and/or the determining of an availability takes place with the aid of at least one remote control box.

In one variation of the proposed method, it is specified that the system comprises a remote control box which can be coupled or is coupled to the installation and/or can be or is operatively connected to the installation and is designed such that with the aid of the remote control box, the controlling and/or the determining of an availability can take place or takes place; and/or the remote control box can execute or executes the controlling and/or the determining of availability.

The system can be designed in any way as desired, in one form, such that said system comprises no additional or at least one additional remote control box.

Each of the remote control boxes can be designed in any way as desired, in one form, such that said remote control box is coupled to at least one of the sensors and/or is operatively connected to at least one of the sensors and/or comprises at least one of the sensors.

In one variation of the proposed method, it is specified that the specifying of the period of time and/or the setting of an upward flexibility and/or the setting of a downward flexibility and/or the setting of a selling threshold price and/or the setting of a purchasing threshold price and/or the concluding of an electricity trading transaction and/or the controlling and/or the determining of an availability and/or the terminating or canceling or settling of the concluded electricity trading transaction takes place with the aid of at least one control device.

In one variation of the proposed method, it is specified that the system comprises a control device which can be coupled or is coupled to the installation and/or can be or is operatively connected to the installation and is designed such that with the aid of the control device, the specifying of the period of time and/or the setting of an upward flexibility and/or the setting of a downward flexibility and/or the setting of a selling threshold price and/or the setting of a purchasing threshold price and/or the concluding of an electricity trading transaction and/or the controlling and/or the determining of an availability and/or the terminating or canceling or settling of the concluded electricity trading transaction can take place or takes place; and/or the control device, can execute or executes the specifying of the period of time and/or the setting of an upward flexibility and/or the setting of a downward flexibility and/or the setting of a selling threshold price and/or the setting of a purchasing threshold price and/or the concluding of an electricity trading transaction and/or the controlling and/or determining of an availability and/or the terminating or canceling or settling of the concluded electricity trading transaction.

The system can be designed in any way as desired, in one form, such that said system comprises no additional or at least one additional control device.

Each of the control devices can be designed in any way as desired, in one form, such that said control device is coupled to at least one of the remote control boxes and/or is operatively connected to at least one of the remote control boxes and/or is integrated into at least one of the remote control boxes and/or comprises at least one of the remote control boxes and/or is coupled to at least one of the sensors and/or is operatively connected to at least one of the sensors and/or comprises at least one of the sensors.

In one variation of the proposed method, it is specified that at least one of the electricity trading transactions is concluded and/or at least one of the concluded electricity trading transactions is terminated or canceled or settled with the aid of at least one electricity exchange.

In one variation of the proposed method, it is specified that an electricity exchange can be or is coupled to the system and/or can be or is operatively connected to the system and is designed such that with the aid of the electricity exchange, at least one of the electricity trading transactions can be concluded and/or at least one of the concluded electricity trading transactions can be terminated or canceled or settled; and/or the electricity exchange can execute or executes the conclusion of at least one of the electricity trading transactions and/or the termination or cancellation or settlement of at least one of the concluded electricity trading transactions.

The system can be designed in any way as desired, in one form, such that said system cannot be coupled or is coupled to no additional or at least one additional electricity exchange and/or cannot or is operatively connected to any additional or at least one additional electricity exchange.

In one form, it is specified that the system comprises at least one of the electricity exchanges.

Each of the electricity exchanges can be designed in any way as desired, in one form, as a computer exchange and/or such that said electricity exchange can be or is coupled to at least one of the control devices and/or can be or is operatively connected to at least one of the control devices and/or is integrated into at least one of the control devices.

In one variation of the proposed method, it is specified that the setting of an upward flexibility and/or the setting of a downward flexibility and/or the setting of a selling threshold price and/or the setting of a purchasing threshold price and/or the concluding of an electricity trading transaction and/or the controlling and/or the determining of an availability and/or the terminating or canceling or settling of the concluded electricity trading transaction takes place with the aid of at least one artificial neural network, abbreviated to ANN.

In one variation of the proposed method, it is specified that the system comprises an artificial neural network and is designed such that with the aid of the artificial neural network, the setting of an upward flexibility and/or the setting of a downward flexibility and/or the setting of a selling threshold price and/or the setting of a purchasing threshold price and/or the concluding of an electricity trading transaction and/or the controlling and/or the determining an availability and/or the terminating or canceling or settling of the concluded electricity trading transaction can take place or takes place; and/or the artificial neural network can execute or executes the setting of an upward flexibility and/or the setting of a downward flexibility and/or the setting of a selling threshold price and/or the setting of a purchasing threshold price and/or the concluding of an electricity trading transaction and/or the controlling and/or the determining of an availability and/or the terminating or canceling or settling of the concluded electricity trading transaction.

The system can be designed in any way as desired, in one form, such that said system comprises no additional or at least one additional ANN.

Each of the ANNs can be designed in any way as desired, in one form, such that said ANN is coupled to at least one of the control devices and/or is operatively connected to at least one of the control devices and/or is integrated into at least one of the control devices.

In one variation of the proposed method, it is specified that historical data, plan data and/or real-time data are stored in at least one database.

In a variation of the proposed system, it is specified that the system comprises a database in which historical data, plan data and/or real-time data can be or are stored. The system can be designed in any way as desired, in one form, such that said system comprises no additional or at least one additional database.

Each of the databases can be designed in any way as desired, in one form, such that said database is coupled to at least one of the remote control boxes and/or is operatively connected to at least one of the remote control boxes and/or is integrated into at least one of the remote control boxes and/or is coupled to at least one of the control devices and/or is operatively connected to at least one of the control devices and/or is integrated into at least one of the control devices and/or is coupled to at least one of the ANNs and/or is operatively connected to at least one of the ANNs and/or is integrated into at least one of the ANNs.

In one form, one of the proposed methods can be executed with each of the proposed systems. Each of the proposed systems can, in one form, be designed in such a way or be used or be suitable for executing or being able to execute one of the proposed methods.

The explanations relating to any one of the aspects of the present disclosure, in particular to individual features of this aspect, also apply analogously to the other aspects of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

Variations of the present disclosure are explained in more detail below, in one form, with reference to the accompanying drawings. However, the resulting individual features are not limited to the individual variations but can be connected and/or combined with individual features described above and/or with individual features of other variations. The details in the drawings are only to be interpreted as illustrative and not restrictive. The reference characters contained in the claims are not intended to limit the scope of the present disclosure in any way, but merely refer to the variations shown in the drawings.

Figure 1:
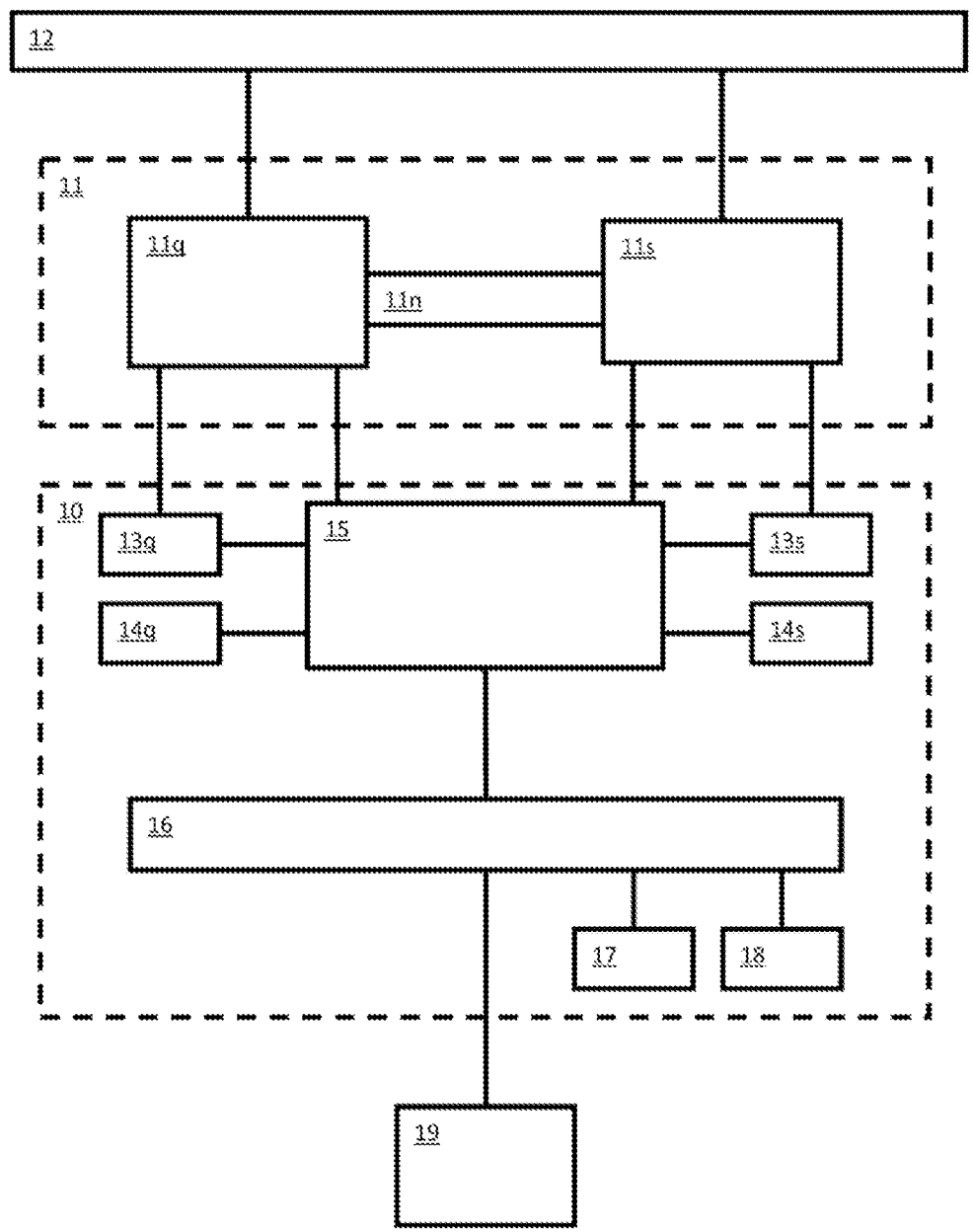
FIG. 1 illustrates one variation of a system for controlling an electrical installation, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 schematically shows a variation of a system 10 according to the present disclosure for controlling an electrical installation 11. The installation 11 is, in one form, a steel plant 11 and comprises an energy source $11q$ in the form of a gas power plant $11q$, an energy sink $11s$ in the form of an arc furnace $11s$ and an installation-internal or plant-internal power grid or plant network or plant network $11n$. The energy sink $11s$ is connected to a public power grid 12 and also coupled to the energy source $11q$ via the plant network $11n$. The energy source $11q$ is also coupled to the power grid 12. The installation 11 is thus coupled to the power grid 12.

The system 10 comprises first and second sensors $13q$, $13s$, a first and a second availability switch $14q$, $14s$, a remote control box 15, a control device 16, an artificial neural network 17 and a database 18. The first sensor $13q$ is coupled to the energy source $11q$ and the second sensor $13s$ is coupled to the energy sink $11s$. The remote control box 15 is coupled to the energy source $11q$, the energy sink $11s$, the sensors $13q$, $13s$ and the availability switches $14q$, $14s$. The control device 16 is coupled to the remote control box 15. The ANN 17 and the database 18 are coupled to the control device 16. An electricity exchange 19 in the form of a computer exchange 19 is coupled to the control device 16. Thus, the sensors $13q$, $13s$ are coupled to the installation 11, the remote control box 15 is coupled to the installation 11, the control device 16 is coupled to the installation 11, the sensors $13q$, $13s$ and the availability switches $14q$, $14s$, the system 10 is coupled to the installation 11, and the electricity exchange 19 is coupled to the system 10.

Operating data that are relevant to the operation of the installation 11 and describe the operation of the installation 11 are stored in the database 18. Said operating data comprise historical data, plan data and real-time data. The historical data describes the previous, past time profiles of the utilization of the energy source 11$q$, the power consumption of the energy source 11$q$, the utilization of the energy sink 11$s$ and the power output of the energy sink 11$s$. The plan data describe the planned, future time profiles of the utilization of the energy source 11$q$, the power consumption of the energy source 11$q$, the utilization of the energy sink 11$s$ and the power output of the energy sink 11$s$. The real-time data describe the current time profiles of the utilization of the energy source 11$q$, the power consumption of the energy source 11$q$, the utilization of the energy sink 11$s$ and the power output of the energy sink 11$s$.

The real-time data of the energy source 11$q$ are determined with the aid of the sensor 13$q$, and the real-time data of the energy sink 11$s$ are determined with the aid of the sensor 13$s$. The sensor 13$q$ comprises a power meter that records the electrical power emitted by the energy source 11$q$, and a monitoring device that monitors the state, the degree of wear and any faults in the energy source 11$q$ and generates corresponding monitoring signals and sends said signals to the remote control box 15. The sensor 13$s$ comprises a power meter, which detects the electrical power absorbed by the energy sink 11$s$, and a monitoring device, which monitors the state, the degree of wear and any faults in the energy sink 11$s$ and sends corresponding monitoring signals to the remote control box 15.

Each availability switch 14$q$, 14$s$ can assume a first and a second switching state and sends corresponding switch signals to the remote control box 15. If an operator actuates one of the availability switches 14$q$, 14$s$, said availability switch 14$q$, 14$s$ assumes its second switching state; without this actuation, said availability switch 14$q$, 14$s$ assumes its first switching state.

The energy source 11$q$ and the energy sink 11$s$ are controlled with the aid of the remote control box 15. Said controlling comprises changing the power output of the energy source 11$q$ in the plant network 11$n$, disconnecting the energy source 11$q$ from the plant network 11$n$, connecting the energy source 11$q$ to the plant network 11$n$, changing the power output of the energy source 11$q$ in the power grid 12, disconnecting the energy source 11$q$ from the power grid 12, connecting the energy source 11$q$ to the power grid 12, changing the power consumption of the energy sink 11$s$ from the plant network 11$n$, disconnecting the energy sink 11$s$ from the plant network 11$n$, connecting the energy sink 11$s$ to the plant network 11$n$, changing the power consumption of the energy sink 11$s$ from the power grid 12, disconnecting the energy sink 11$s$ from the power grid 12 and connecting the energy sink 11$s$ to the power grid 12.

With the aid of the remote control box 15, the availability of the energy source 11$q$ is determined as a function of the monitoring signals from the sensor 13$q$ and is correspondingly set to the value "available" or to the value "not available". The remote control box 15 continuously sends the respective value, which depends on this currently determined availability, to the control device 16, in one form a controller, if the switch signal of the availability switch 14$q$ corresponds to the second switching state, otherwise, that is, if the switch signal of said availability switch 14$q$ corresponds to the first switching state or not to the second switching state, the remote control box 15 sends the value "not available" to the control device 16. With the aid of the remote control box 15, the availability of the energy sink 11$s$ is determined as a function of the monitoring signals from the sensor 13$s$ and is correspondingly set to the value "available" or to the value "not available". The remote control box 15 continuously sends the respective value, which depends on this currently determined availability, to the control device 16 if the switch signal of the availability switch 14$s$ corresponds to the second switching state, otherwise, that is if the switch signal of said availability switch 14$s$ corresponds to the first switching state or not to the second switching state, the remote control box 15 sends the value "not available" to the control device 16.

Figure 2:
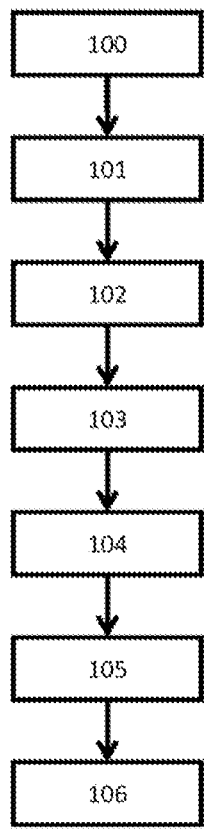
FIG. 2 is a first variation of a method for controlling the electrical installation, according to the teachings of the present disclosure.

FIG. 2 shows a first variation of a method according to the present disclosure for controlling the electrical installation 11 as a flow chart; the following description of this variation uses the data and explanations from example 3 described above as an example. The system 10 is designed to execute this variation.

In a step 100, a future time period having a start time and a duration is specified.

The duration is, in one form, 15 minutes and the start time is, in one form, 24 hours after the start of said step.

This step 100 is carried out with the aid of the control device 16.

In a step 101 which follows step 100, an upward flexibility is set for the period of time. The upward flexibility comprises a forecast maximum feed-in power increase and a forecast maximum feed-out power decrease. This setting comprises plan data and real-time data being evaluated.

In one form, the maximum feed-in power increase is Eo=30 MW, the maximum feed-out power decrease is, in one form, Au=2 MW, and the upward flexibility is, in one form, Fo=32 MW. This setting comprises plan data and real-time data being evaluated.

This step 101 is executed with the aid of the control device 16, the ANN 17 and the database 18.

In a step 102 which follows step 101, a downward flexibility is set for the period of time. The downward flexibility comprises a forecast maximum feed-out power increase and a forecast maximum feed-in power decrease. This setting comprises plan data and real-time data being evaluated.

The maximum feed-out power increase is, in one form, Ao=6 MW, the maximum feed-in power decrease is, in one form, Eu=16 MW, and the downward flexibility is, in one form, Fu=22 MW.

This step 102 is executed with the aid of the control device 16, the ANN 17 and the database 18.

In a step 103 which follows step 102, a selling threshold price is set for the period of time. This determination comprises historical data, plan data and real-time data being evaluated.

In one form, the selling threshold price is Pv=€1.20/MWh.

This step 103 is executed with the aid of the control device 16, the ANN 17 and the database 18.

In a step 104 which follows step 103, a purchasing threshold price is set for the period of time. This setting comprises historical data, plan data and real-time data being evaluated.

In one form, the purchasing threshold price is Pe=€0.80/MWh.

This step 104 is executed with the aid of the control device 16, the ANN 17 and the database 18.

In a step 105 which follows step 104, an electricity trading transaction is negotiated and, optionally, concluded for the period of time. The electricity trading transaction comprises a base value, a base amount, a base price, a date on which the electricity trading transaction must be executed and the obligation for physical fulfillment during this period of time.

According to a first variation case, the following conditions are proposed in the negotiation: the base value is a positive on-demand power; the base amount, namely, the amount of positive on-demand power is ALp=30 MW; the base price, namely, the price of the positive on-demand power, is BPp=€1.30/MWh. The physical fulfillment should therefore comprise the delivery of 30 MW of positive on-demand power. It is first checked whether the base value is a positive or negative on-demand power. In this variation case, the first alternative applies, so it is now checked whether ALp≤Fo and BPp≥Pv is applicable. This is also the case in this variation case, since 30 MW≤32 MW and €1.30/MWh≥€1.20/MWh. Therefore, the electricity trading transaction will be concluded at these proposed conditions. Otherwise, the electricity trading transaction would not be concluded under these conditions.

According to a second variation case, the following conditions are proposed in the negotiation: the base value is a negative on-demand power; the base amount, namely, the amount of negative on-demand power, is ALn=22 MW; the basic price, namely the price of the negative on-demand power, is BPn=€0.70/MWh. The physical fulfillment should therefore comprise the delivery of 22 MW of negative on-demand power. It is first checked whether the base value is a positive or negative on-demand power. In this variation case, the second alternative applies, so it is now checked whether ALn≤Fu and BPn≤Pe is applicable. This is also the case in this variation case, since 22 MW≤22 MW and €0.70/MWh≥€0.80/MWh. Therefore, the electricity trading transaction will be concluded at these proposed conditions. Otherwise, the electricity trading transaction would not be concluded under these conditions.

This step 105 is executed with the aid of the control device 16, the ANN 17, the database 18 and the electricity exchange 19.

In a step 106 which follows step 105, installation 11 is controlled on the date such that installation 11 supplies the base value in the amount of the base amount during the period of time, that is, that in the case of positive on-demand power, the installation 11 loads upward flexibility until the base amount of positive on-demand power is reached and in the case of negative on-demand power, loads downward flexibility until the base amount of negative on-demand power is reached.

In the first variation case described in step 105, the installation 11 loads the upward flexibility during the time period up to reaching Alp=30 MW and thus only partially, since Alp<Fo applies. Said loading takes place, in one form, by the energy source 11q raising its feed-in power from the planned value E0=20 MW to the maximum value E2=50 MW and the energy sink 11s leaving its feed-out power unchanged at the planned value A0=5 MW, or by, in one form, energy sink 11s lowering its feed-in power from the planned value A0=5 MW down to the minimum value A1=3 MW and the energy source 11q raising its feed-in power from the planned value E0=20 MW to 48 MW, or, in one form, by the energy sink 11s decreasing its feed-out power from the planned value A0=5 MW to 4 MW and the energy source 11q increasing its feed-in power from the planned value EU=20 MW to 49 MW. Other combinations are also possible if desired, as long as the 30 MW are reached.

In the second variation case described in step 105, the installation 11 loads the downward flexibility during the time period until reaching Fu=22 MW and thus fully, since ALn=Fu applies. Said loading takes place, in one form, by the energy source 11q decreasing its feed-in power from the planned value EU=20 MW down to the minimum value E1=4 MW and the energy sink 11s increasing its feed-out power from the planned value A0=5 MW up to the maximum value A2=11 MW.

This step 106 is executed with the aid of the control device 16, the sensors 13q, 13s, the remote control box 15 and the ANN 17.

Figure 3:
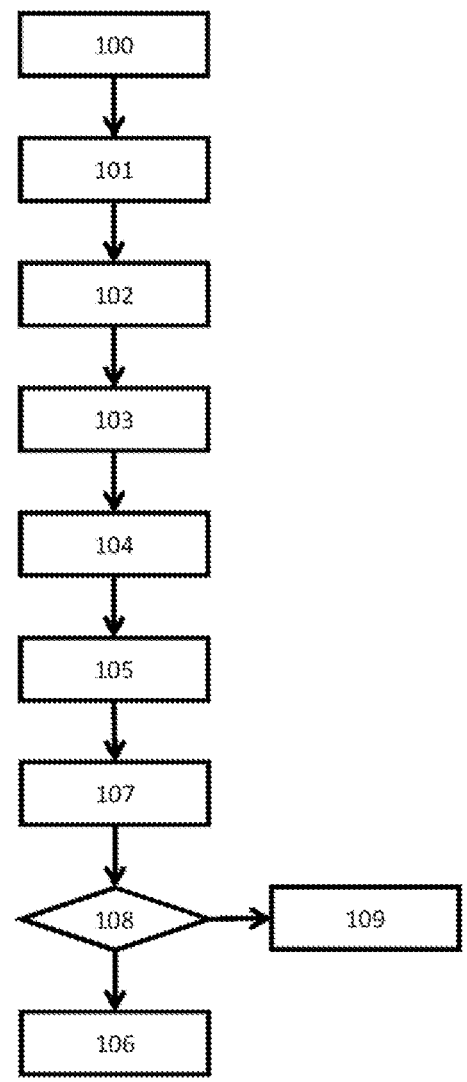
FIG. 3 is a second variation of the method for controlling the electrical installation, according to the teachings of the present disclosure.

FIG. 3 shows a second variation of the method for controlling the electrical installation 11 as a flowchart. This variation is similar to the first variation, so that the differences are explained in more detail below. The system 10 is designed to execute this variation.

In a step 107 which follows step 105, an availability of the installation 11 is determined. This determination is made in the manner described above in connection with the system 10.

This step 107 is executed with the aid of the control device 16, the sensors 13q, 13s, the availability switches 14q, 14s, the remote control box 15 and the ANN 17.

In a step 108 which follows step 107, according to a first alternative, it is checked whether the determined availability has the value "available". If YES, jump to step 106, if NO, jump to step 109. According to a second alternative, it is checked whether the determined availability has the value "not available". If YES, jump to step 109, if NO, jump to step 106.

This step 108 is executed with the aid of the control device 16 and the ANN 17.

In step 109, the concluded electricity trading transaction is terminated or canceled or settled. The cancellation or settlement of the concluded electricity trading transaction takes place with the aid of at least one counter electricity trading transaction, which is concluded analogously to the conclusion of the concluded electricity trading transaction.

This step 109 is executed with the aid of the control device 16, the electricity exchange 19 and the ANN 17.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller", "control device", "control box", and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling, by at least a control device, at least one electrical installation, wherein the at least one electrical installation comprises at least one electrical energy source, at least one electrical energy sink, or a combination thereof, and the at least one electrical installation is coupled to a power grid, the method, executed by the control device, comprising:
    setting an upward flexibility for a future period of time, wherein the future period of time is defined by a start time and a specified duration, wherein the upward flexibility comprises at least one of a forecast maximum feed-in power increase and a forecast maximum feed-out power decrease;
    setting a downward flexibility for the future period of time, wherein the downward flexibility comprises at least one of a forecast maximum feed-out power increase and a forecast maximum feed-in power decrease;
    setting a selling threshold price for the future period of time;
    setting a purchasing threshold price for the future period of time; and
    completing at least one electricity trading transaction for the future period of time, wherein the at least one electricity trading transaction comprises a base value, a base amount, a base price, a date on or by which the at least one electricity trading transaction is to be carried out, and an obligation for physical fulfillment during this period of time, wherein:
        the base value comprising a positive or negative on-demand power;
        the date of said electricity trading transaction being said start time of said future period of time;
        the physical fulfillment comprising a delivery of the base value in an amount of the base amount;
        in a case of positive on-demand power, the at least one electricity trading transaction provides $ALp \leq Fo$ and $BPp \geq Pv$, wherein ALp is the base amount of positive on-demand power, Fo is the upward flexibility, BPp is the base price of the positive on-demand power, and Pv is the selling threshold price;
        in a case of negative on-demand power, the at least one electricity trading transaction provides $ALn \leq Fu$ and $BPn \leq Pe$, wherein ALn is the base amount of negative on-demand power, Fu is the downward flexibility, BPn is the base price of the negative on-demand power, and Pe is the purchasing threshold price; and
        on or by said date of said electricity trading transaction the at least one electrical installation is controlled and configured to deliver the base value in the amount of the base amount during the period of time.

2. The method according to claim 1, wherein at least one of the setting of the upward flexibility, the setting of the downward flexibility, the setting of the selling threshold price, and the setting of the purchasing threshold price comprises at least one of historical data, plan data and real-time data being evaluated.

3. The method according to claim 2, wherein the real-time data is determined at least in part with at least one sensor.

4. The method according to claim 3 further comprising:
    determining an availability of the at least one electrical installation; and
    in response to the availability not having a value "available" or having a value "not available", terminating, cancelling, or settling a concluded electricity trading transaction.

5. The method according to claim 4, wherein the concluded electricity trading transaction is canceled or settled using at least one counter electricity trading transaction.

6. The method according to claim 5, wherein the counter electricity trading transaction is concluded analogously to a conclusion of the concluded electricity trading transaction.

7. The method according to claim 4, wherein at least one of the controlling of the at least one electrical installation and the determining of the availability takes place with aid of at least one remote control box.

8. The method according to claim 7, wherein at least one of:
    specifying of the period of time;
    specifying of the start time;
    the setting of the upward flexibility;
    the setting of the downward flexibility;
    the setting of the selling threshold price;
    the setting of the purchasing threshold price;
    the concluding of the electricity trading transaction;
    the controlling of the at least one electrical installation, the determining of the availability of the at least one electrical installation; and
    one of the terminating, canceling or settling of the concluded electricity trading transaction is performed with the control device.

9. The method according to claim 8, wherein at least one of the conclusion of the electricity trading transaction and one of the termination, cancellation, settlement of the concluded electricity trading transaction takes place with aid of at least one electricity exchange.

10. The method according claim 4, wherein at least one of:
    the setting of the upward flexibility;
    the setting of the downward flexibility;
    the setting of the selling threshold price;
    the setting of the purchasing threshold price;
    a concluding of the electricity trading transaction;
    controlling of the at least one electrical installation;
    the determining of the availability of the at least one electrical installation; and at least one of the terminating, canceling or settling of the concluded electricity trading transaction takes place with aid of at least one artificial neural network.

11. The method according to claim 1 further comprising storing at least one of historical data, plan data and real-time data in at least one database.

12. A system, comprising a control device, for controlling at least one electrical installation, wherein the at least one electrical installation comprises at least one of at least one electrical energy source and at least one electrical energy sink, wherein:
the at least one electrical installation being coupled to a power grid;
the system being coupled to the at least one electrical installation; and
the system, executed by the control device, being configured to:
set an upward flexibility for a future period of time, wherein the future period of time is defined by a start time and a specified duration, wherein the upward flexibility comprises at least one of historical data, plan data, real-time data being determined at least in part with at least one sensor, a forecast maximum feed-in power increase and a forecast maximum feed-out power decrease;
set a downward flexibility for the future period of time, wherein the downward flexibility comprises at least one of historical data, plan data, real-time data being determined at least in part with at least one sensor, a forecast maximum feed-out power increase and a forecast maximum feed-in power decrease;
set a selling threshold price for the future period of time, wherein the setting of the selling threshold price comprises at least one of historical data, plan data, and real-time data being determined at least in part with at least one sensor;
set a purchasing threshold price for the future period of time, wherein the setting of the selling threshold price comprises at least one of historical data, plan data, and real-time data being determined at least in part with at least one sensor; and
complete at least one electricity trading transaction for the future period of time, wherein the at least one electricity trading transaction comprises a base value, a base amount, a base price, a date on or by which the at least one electricity trading transaction is to be carried out, and an obligation for physical fulfillment during this period of time, wherein:
the base value comprising a positive or negative on-demand power;
the date of said electricity trading transaction being said start time of said future period of time;
the physical fulfillment comprising a delivery of the base value in the amount of the base amount;
in a case of positive on-demand power, the at least one electricity trading transaction provides $ALp \leq Fo$ and $BPp \geq Pv$, wherein ALp is the base amount of positive on-demand power, Fo is the upward flexibility, BPp is the base price of the positive on-demand power, and Pv is the selling threshold price;
in a case of negative on-demand power, the at least one electricity trading transaction provides $ALn \leq Fu$ and $BPn \leq Pe$, wherein ALn is the base amount of negative on-demand power, Fu is the downward flexibility, BPn is the base price of the negative on-demand power, and Pe is the purchasing threshold price;
on or by said date of said electricity trading transaction the at least one electrical installation is controlled and configured to deliver the base value in the amount of the base amount during the period of time; and
in response to, based on determining an availability of the at least one electrical installation, the availability not having the value "available" or having the value "not available", terminating, cancelling, or settling a concluded electricity trading transaction.

13. The system according to claim 12, wherein the at least one sensor is coupled to the at least one electrical installation.

14. The system according to claim 12 further comprising at least one remote control box coupled to the at least one electrical installation, wherein the remote control box is configured to execute at least one of controlling of the at least one electrical installation and the determination of the availability of the at least one electrical installation.

15. The system according to claim 12 further comprising the control device coupled to the at least one electrical installation, wherein the control device is configured to execute at least one of:
specifying of the period of time;
specifying of the start time;
the setting of an upward flexibility;
the setting of a downward flexibility;
the setting of a selling threshold price;
the setting of a purchasing threshold price;
the concluding of an electricity trading transaction;
the controlling of the at least one electrical installation;
the determining of the availability of the at least one electrical installation; and
one of the terminating, canceling and settling of the concluded electricity trading transaction.

16. The system according to claim 12, wherein at least one electricity exchange is coupled to the system, wherein the at least one electricity exchange is configured to execute at least one of the concluding of an electricity trading transaction and one of the terminating, canceling, and settling of the concluded electricity trading transaction.

17. The system according to claim 16 further comprising the electricity exchange.

18. The system according to claim 12 further comprising at least one artificial neural network is configured to execute at least one of:
the setting of an upward flexibility;
the setting of a downward flexibility;
the setting of a selling threshold price;
the setting of a purchasing threshold price;
the concluding of an electricity trading transaction;
the controlling of the at least one electrical installation;
the determining of the availability of the at least one electrical installation; and
one of the terminating, canceling and settling of the concluded electricity trading transaction.

19. The system according to claim 12 further comprising at least one database having at least one of historical data, plan data and real-time data stored.

* * * * *